Feb. 21, 1961   C. K. GRAVLEY   2,972,176
PRESTRESSED DIELECTRIC CERAMIC BODIES
Filed Feb. 15, 1956

FIRE TO MATURITY THIN SHAPES OF $BaTiO_3$ OR $BaTiO_3$-BASED CERAMIC CONTAINING AT LEAST ABOUT 0.2 WEIGHT PERCENT GLASS FORMING INGREDIENTS

↓

COOL MATURE CERAMIC SHAPES TO A TEMPERATURE BELOW 600°C AT A RATE ABOVE 200°C PER SECOND

*INVENTOR.*
CHARLES K. GRAVLEY
BY
ATTORNEY

United States Patent Office 2,972,176
Patented Feb. 21, 1961

2,972,176

PRESTRESSED DIELECTRIC CERAMIC BODIES

Charles K. Gravley, Willoughby, Ohio, assignor to Clevite Corporation, Cleveland, Ohio, a corporation of Ohio Filed Feb. 15, 1956, Ser. No. 565,745

8 Claims. (Cl. 25—157)

This invention relates to polycrystalline ceramic materials and particularly to polarizable ferroelectric ceramic bodies for use as electromechanical transducers.

In recent years it has been discovered that certain polycrystalline ceramic materials, when polarized by the application of an electrostatic field, exhibit an electromechanical transducing action similar to the piezoelectric effect displayed by quartz, tourmaline, Rochelle salt, and other crystalline materials. Perhaps the most prominent of such materials at the present time is barium titanate, the polarization and electromechanical properties of which are disclosed in U.S. Letters Patent No. 2,486,560 to R. B. Gray.

The present invention will be described as applied to barium titanate ceramics but it will be understood that it may be used with equal or similar advantage to various other electromechanically sensitive polycrystalline ceramic materials which will be referred to as polarizable ferroelectric ceramic materials and have similar properties as will hereinafter be pointed out.

While the Gray patent discloses barium titanate elements of comparatively large size and considerable mechanical strength, commercial mass production of such elements is enhanced by the use of a dipping process wherein a non-refractory form is dipped in a slip or dispersion of ceramic raw material. When subsequently fired to mature the ceramic, the unrefractory form is burned out and the resulting structure is a hollow member, having a cross-sectional configuration which conforms generally to that of the form, and having relatively thin side walls.

Such methods of fabricating electromechanical ceramic elements are disclosed in U.S. Letters Patent Nos. 2,569,163 and 2,554,327 both issued to C. K. Gravley and assigned to the same assignee as the present invention.

As is well known in the art, a piezoelectric member generates an electrical charge in response to mechanical deformation and vice versa. Accordingly, it is necessary that the element be possessed of a certain minimum amount of flexibility and mechanical strength depending on its intended use. In many applications, as in phonograph pickups for example, where mechanical distortion of the ceramic element, produced by a stylus operating in a record groove, generates an electrical signal, it is important that the ceramic element be small in all dimensions and also that it be sufficiently compliant as to respond readily and sensitively to the minute vibrations of the stylus.

The same is true of the converse application of such transducers to record cutters, wherein the electrical signal applied drives the cutting stylus. The elements produced by dipping procedures such as described in the aforementioned U.S. Letters Patent to Gravley are ideally suited to such applications by virtue of their hollow configuration and thin wall thickness.

However, inasmuch as phonograph pickup and recording cutting elements and similar transducer devices are often subject to mechanical shocks in service which lead to breakage of the element, it is desirable that the element be made as strong as possible without substantially decreasing its compliance or increasing its size, as would result from increasing the cross-sectional dimensions.

The present invention contemplates a method of fabricating electromechanically-sensitive polycrystalline ceramic material containing glass-forming ingredients which includes the step of cooling such material, at a controlled, relatively rapid rate, from a temperature at which the glass-forming components contained therein are softened, to a lower temperature at which such glass-forming components harden to form an amorphous glass matrix throughout the material. This procedure results in the development of permanent strains in the material which greatly increase the flexural breaking strength thereof.

According to another feature, the invention contemplates as an article of manufacture, electromechanically sensitive, polycrystalline ceramic material having interspersed therethrough an amorphous glass matrix, the material being characterized by the existence therein of a permanent strain which is compressive in nature adjacent the surface portions of the material and tensile in nature in the interior portions of the material.

It is, therefore, a fundamental object of the present invention to provide a novel and improved method of fabricating polycrystalline ceramic electromechanical transducer elements and materials.

More particularly it is an object of the invention to provide methods of fabricating polycrystalline ceramic electromechanical transducer materials and elements of increased mechanical strength.

A further object resides in the provision of novel methods of heat treating polycrystalline ceramic electromechanical transducer materials and elements to increase their breaking strength in flexure.

A still further object is the provision of ceramic electromechanical transducer elements of higher breaking strength, in flexure, than conventional ceramic elements of comparable dimensions.

These and further objects of the invention and the manner of their accomplishment will be apparent to those conversant with the art from the following description and subjoined claims taken in conjunction with the annexed drawing, the single figure of which constitutes a flow sheet illustrating the method steps of the invention.

In fabricating polycrystalline ceramic electromechanical transducer elements and the mature stock from which they are made, the ceramic raw materials, in the case of barium titanate, barium oxide (BaO) or barium carbonate ($BaCO_3$) and titania ($TiO_2$) are finely ground, preferably in a ball mill, to a very fine particle size. If desired, commercially available barium titanate of relatively high purity may be used as the raw material. The mill charge includes, in addition to the raw materials and milling balls or stones, water or some other suitable vehicle, a dispersal agent, binder, and plasticizing agent for the binder so as to form a slip of suitable consistency.

A form or support structure of unrefractory material having the cross-sectional shape and dimensions desired is coated with the slip. The coating is first dried and then fired to ceramic maturity at a temperature suitable for the particular ceramic material. For barium titanate, firing is usually carried out at temperatures ranging from about 1300° to 1450° C.

In practice the coating and firing preferably is carried out as a continuous process in which the supporting structure or form is an elongated strip, filament or tape which is suitably guided as it runs through the ceramic slip, then a drying stage, and finally through a firing oven from which it normally emerges and cools naturally at ambient temperatures. Whether carried out as a batch or continuous process, the method thus far is substantially as disclosed in the aforementioned U.S. Letters Patent to Gravley and U.S. Letters Patent Nos. 2, 875,501 and 2,861,320 both issued to C. K. Gravley and assigned to the same assignee as the present invention. As explained therein, in the course of firing, the non-refractory supporting structure or form is burned out leaving the fired material with an internal cavity conforming in cross-section to the burned-out supporting structure.

The elongate, hollow, fired ceramic material thus obtained comprises the stock from which individual elements may be fabricated.

It will be understood as this description proceeds that, as applied to hollow stock or elements, a greater percentage improvement in breaking strength may be achieved where the ratio of cross-sectional area of solid material to that of the cavity is relatively higher. Accordingly, the primary field of applicability of the invention would be ceramic stock or elements such as disclosed in the aforementioned U.S. Letters Patent Nos. 2,875,501 and 2,861,320 and, of course, to solid shapes or sections of the ceramic materials in question.

As is well known in the art, barium titanate and various other ceramics, some of which are hereinafter mentioned are polycrystalline (as opposed to amorphous) in character having a perovskite crystal structure. The fact that such ceramics may be polarized by an electrostatic field to render them piezoelectrically active stems from this crystalline nature and is believed due to the alignment of the ferroelectric domains of the material by the electrostatic field. It has been discovered, however, that such polycrystalline ceramics can be fabricated so as to impart to them a higher breaking strength in flexure by the development therein of permanent strains and the formation of an amorphous glass matrix interspersed throughout the ceramic enables the creation and retention of such stains.

According to the present invention polycrystalline ceramic material produced in the manner described above, or by any other suitable method, and containing glass-forming constituents is cooled, at a controlled, relatively rapid rate from a temperature at which the glass-former constituents are softened to a lower temperature at which such constituents harden to form an amorphous glass matrix in the ceramic. The particular temperature from which the ceramic stock is cooled and the specific rate and conditions of cooling must be determined empirically for the particular material being handled, as hereinafter explained. For barium titanate the temperature at which the glass-formers are softened coincides roughly with the firing temperature, with excellent results obtained in the range from 1300° C. to 1350° C. For the cooling rate, barium titanate stock approximately 60 mils wide by 26 mils thick was cooled at a rate of about 650° per second, i.e., from a temperature of 1300° to 600° C. in approximately two seconds, with entirely satisfactory results. This cooling was accomplished by passing the stock at a rate of about 60 inches per minute between a pair of opposing, coaxial air jets. The air jets issued from a pair of oppositely-directed, rectangular orifices arranged about 1 inch apart and with the flow axes colinear and perpendicular to the plane of the material. Each orifice was about 5 to 10 mils wide and ⅛ inch long with width and length being measured, respectively, across the stock and parallel to the direction of travel of the stock. Air under a pressure of about 2 to 5 p.s.i. was supplied to the orifices.

The cooling rate should be as high as possible, the upper limit being just under the rate which causes mechanical failure of the material due to thermal shock. For barium titanate ceramic stock up to about 50 mils in thickness, 650° C per second approaches the maximum rate. For thicker stock, a lower cooling rate would be necessary to avoid shattering the material.

The effectiveness of the process decreases progressively with a substantial decrease from the maximum cooling rate and, therefore, there is no well-defined lower limit. Suffice it to say, then that the minimum cooling rate must be high enough to be effective to cause the development in the material of a permanent strain of sufficient magnitude to increase substantially the flexural breaking strength of the material. Generally speaking, the minimum rate would usually be about 30 to 50% of the maximum rate for the particular material and stock dimensions.

It is believed that the glass-formers function as a lubricant or vehicle and thus lend mobility to the crystallites constituting ceramic material. This enables the development of strains in the material and, as a result of process herein described, a tensile strain is developed in the interior of the material and compressive strains are developed adjacent the surface areas. The mechanism of the formation and the distribution of such strains is well known, per se, in the art of making "prestressed" or "toughened" glass. Upon hardening, the glass-formers permanently bond or set the strains in the ceramic material.

The maximum temperature of the material at the termination of the cooling step should be in the order of 300° to 600° C. depending on the nature of the material. In other words the material should be cooled below the temperature at which the amorphous matrix hardens to retain the permanent strain, i.e., below the annealing temperature of the matrix.

While the invention would ordinarily or most easily be applied to a fired material, reheated, and then subjected to the rapid forced cooling step, it is pointed out that the forced cooling may follow directly after the original firing of the material. However, in a continuous operation such as described above, wherein a continuous coated form is run through a firing oven, it would be necessary to have a very long oven in order to fire the material to maturity at the rate of travel required by the cooling step. In the example given, the forced cooling requires a rate of travel of 60 inches per minute; thus, the fired stock must emerge from the firing oven at the that rate and therefore the oven would have to be extremely long in order for each segment of the coated form to be raised to and held at the firing temperature long enough to mature the ceramic and burn out the supporting structure while traversing the length of the oven at such a relatively high rate of speed. From the standpoint of operativeness, the forced cooling may follow either the original firing or a reheat step, the selection of the alternatives depending on considerations of production facilities and economy.

Turning now to the matter of glass-formers, in the case of barium titanate, glass-forming ingredients may be present as impurities found in the raw materials or introduced during milling by contamination of the mix by milling stone wear. Furthermore, glass-formers may be present in the mix as modifying additions used for some wholly different purpose, for example, to alter the electrical and/or electromechanical properties of the ceramic. Finally, glass-forming ingredients as such may be added as hereinafter discussed and qualified.

Considering first the matter of impurities, the raw materials, particularly where commercial barium titanate is used, frequently contain sufficient glass-forming ingredients such as zirconia, silicates, strontia, and/or iron oxide for the purposes of the invention. The same is true of many other electromechanically sensitive ceramics to which the invention applies. Where flint stones are used in the ball mill, an appreciable amount of silica, e.g., .1 to .2% by weight is introduced into the mix during milling and forms silicates during the firing step.

As for modifying additions, an example of the chemical modification of barium titanate, involving the addition of ingredients which inherently are effective as glass-formers but are added for other purposes, is shown in U.S. Letters Patent No. 2,708,243 to E. J. Brajer, assigned to the same assignee as the present invention. The Brajer patent discloses a barium titanate composition containing substantial quantities of zirconia which, for the purposes of the present invention, serves as the glass-forming ingredient, with or without other glass-forming agents which may be present as impurities.

In the event that the fired material would normally be deficient in glass-formers, small amounts of suitable glass-forming agents may be added solely for the purposes of the invention, provided they do not adversely affect the electromechanical properties of the material to any significant extent.

The amount of glass-formers present in the ceramic material may vary but .2 to .4 percent by weight has been found to be the minimum effective quantity. The maximum percentage of glass-formers is limited by the ability of the ceramic to tolerate their presence without objectional deterioration of its electrical and/or electromechanical properties. In this connection it is to be noted that relatively small percentages of some extraneous materials in barium titanate and other ferroelectric ceramics frequently have a severely detrimental effect on such electrical properties as electromechanical coupling, dielectric constant and dissipation. Therefore, the present invention is applicable to electromechanically sensitive ceramic materials which tolerate, insofar as electrical and/or electromechanical properties are concerned, sufficient quantities of suitable glass-forming agents to lend mobility to the crystallites of the ceramic and enable the development of strains therein in consequence of the process herein described. Among these materials are ceramics such as described in U.S. Letters Patent No. 2,708,244 to Bernard Jaffe, and the aforementioned patent to Brajer, and those described and claimed in U.S. Patent No. 2,906,710, filed August 11, 1955, and in copending applications Ser. Nos. 550,868 and 550,869, both filed December 5, 1955, and now abandoned and all assigned to the same assignee as the present invention.

The magnitudes of the permanent strains produced depend on the rate of cooling (which is limited by the thermal shock resistance of the material and the dimensions of the stock), on the coefficient of expansion of the material, the ratio between its thermal conductivity and specific heat per unit volume, and the percentage of glass-formers present (limited by the effect on the electrical and electromechanical properties) in the ceramic.

As applied to barium titanate, which ordinarily has an average breaking strength of about 13,500 pounds per square inch in flexure, the method disclosed and claimed herein results in an increase of about 75%. This additional breaking strength is not diminished with aging or use of the material. Insofar as is known the heat treatment affects only physical properties, specifically the flexural breaking strength; possibly a slight reduction in compliance may result in certain materials. This can be compensated for by reduction in cross-section while still maintaining an over-all improvement in breaking strength.

The basic method of producing stock outlined hereinabove, may require modification to adapt the stock to more effective application of the present invention. This modification takes the form of an increased amount of milling in order to reduce particle size where necessary in order to develop the glass-formers. It will be understood that, while the invention has been described as applied to fired stock, it may be used with equal advantage on the completely fabricated elements.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. A method of fabricating thin bodies of electromechanically sensitive, polycrystalline, barium titanate and barium titanate-based ceramic material containing glass-forming constituents in lesser quantities than would effectively destroy the electromechanical sensitivity of the material, which includes the step of cooling such bodies, less than about 50 mils thick, at a rate of about 200° to 650° C. per second from a temperature at which said constituents are softened to a temperature below about 600° C.

2. A method of fabricating electromechanically sensitive, polycrystalline, fired, barium titanate and barium titanate-based ceramic material containing glass-forming constituents in lesser quantities than would effectively destroy the electromechanical sensitivity of the material, including the sequential steps of forming thin shapes of such material less than about 50 mils thick, heating said shapes to a temperature at which said constituents are softened; and then cooling said shapes to a temperature below about 600° C. at a cooling rate below that which causes mechanical failure of the material due to thermal shock and in excess of about 200° C. per second.

3. A method of fabricating electromechanically sensitive, ceramic material comprising the sequential steps of compounding a ceramic mixture containing minor quantities of glass-forming ingredients and adapted, upon firing to maturity, to yield a polarizable polycrystalline barium titanate and barium titanate-based ceramic material exhibiting, when polarized, an electromechanical response; forming thin shapes of said material; firing said shapes to ceramic maturity; and then cooling said shapes of said material from a temperature at which said ingredients are softened to a temperature below about 600° C. at a cooling rate in excess of about 200° C. per second but below that rate which causes mechanical failure of the material due to thermal shock.

4. A method of fabricating electromechanically sensitive, titanate-type ceramic material comprising the sequential steps of compounding a ceramic mixture containing minor quantities of glass-forming ingredients and adapted, upon firing to maturity, to yield a permanently electrostatically polarizable polycrystalline barium titanate and barium titanate-based ceramic material exhibiting, when polarized, an electromechanical response; firing said mixture to ceramic maturity; allowing the fired material to cool; forming thin shapes of said material, less than 50 mils thick; heating said shapes to a temperature at which said glass-forming ingredients are softened; and then cooling said shapes of the material to a temperature below about 600° C. at a rate below that which causes mechanical failure of the material due to thermal shock but in excess of about 200° C.

5. A method of fabricating electromechanically sensitive, polycrystalline ceramic material, comprising the sequential steps of compounding a ceramic mixture containing minor quantities of glass-forming ingredients and adapted, upon firing to maturity, to yield a polarizable polycrystalline barium titanate and barium titanate-based ceramic material having, when polarized, a substantial electromechanical response; forming thin shapes of said mixture, less than 50 mils thick; firing said shapes to ceramic maturity; allowing the fired shapes to cool; reheating said shapes to a temperature at which said glass-forming ingredients are softened; subjecting said thin shapes of the material to a flow of a gaseous medium adapted to cool said material at a rate in excess of about 200° C. per second but below that which causes mechanical failure of the material due to thermal shock; and continuing said cooling at least until the temperature of said material falls below about 600° C.

6. A method of fabricating electromechanically sensitive, ceramic material comprising the sequential steps of compounding a mixture of ceramic raw materials containing minor quantities of glass-forming ingredients and adapted, upon firing to maturity, to yield a permanently electrostatically-polarizable, polycrystalline ceramic material composed primarily of barium titanate and exhibiting, when polarized, an electromechanical response; forming thin shapes of said material, less than 50 mils thick; firing said shapes to ceramic maturity; allowing the fired shapes to cool; reheating said shapes, to a temperature in the range 1300° to 1450° C.; and cooling said thin shapes of the material to a temperature below about 600° C. at a rate in excess of 200° per second but not so high as to cause mechanical failure of the material due to thermal shock.

7. A method of fabricating electromechanically sensitive, ceramic material comprising the sequential steps of compounding a mixture of ceramic raw materials containing minor quantities of glass-forming ingredients and adapted, upon firing to maturity, to yield a polycrystalline ceramic material composed primarily of barium titanate and exhibiting, when polarized, an electromechanical response; forming thin shapes of said material, less than 50 mils thick; firing said shapes to ceramic maturity; allowing the fired shapes to cool; reheating said shapes, to a temperature in the range 1300° to 1350° C.; and cooling said thin shapes of the material to a temperature below 600° C. at a rate of about 650° per second.

8. A method of fabricating electromechanically sensitive, ceramic material comprising the sequential steps of compounding a mixture of ceramic raw materials adapted, upon firing to maturity, to yield a permanently electrostatically polarizable polycrystalline barium titanate and barium titanate-based ceramic material exhibiting, when polarized, an electromechanical response; adding to said mixture a minor quantity of glass-forming agents sufficient to raise the total content of such agents in said mixture to at least about .2 percent by weight, said agents and the quantity thereof being selected so as not to substantially adversely affect the electrical and electromechanical properties of said material; forming thin shapes of said material, not more than 50 mils thick; firing said shapes to ceramic maturity; allowing the fired shapes to cool; reheating said shapes to a temperature at which said glass-forming agents are softened; and cooling said material to a temperature below 600° C. at a rate above about 200° per second but not so high as results in mechanical failure of the material due to thermal shock.

References Cited in the file of this patent

UNITED STATES PATENTS

| | | |
|---|---|---|
| 1,819,686 | Malinovszky | Aug. 18, 1931 |
| 2,285,595 | Littelton et al. | June 9, 1942 |
| 2,290,763 | Mueller | July 21, 1942 |
| 2,311,846 | Littelton et al. | Feb. 23, 1943 |
| 2,507,253 | Howatt | May 9, 1950 |
| 2,515,790 | Navias | July 18, 1950 |
| 2,535,025 | Albers-Schoenburg | Dec. 26, 1950 |
| 2,677,663 | Jonker et al. | May 4, 1954 |
| 2,685,568 | Wilson | Aug. 3, 1954 |
| 2,696,651 | Gravley | Dec. 14, 1954 |

OTHER REFERENCES

"Magnetic Ceramics: III, Effects of Fabrication Techniques on Magnetic Properties of Magnesium Ferrite" by George Economos in Journal of the American Ceramic Society, vol. 38, No. 9, pp. 335–340 (1955).